US012778336B2

(12) United States Patent
Pugliese et al.

(10) Patent No.: US 12,778,336 B2
(45) Date of Patent: Nov. 3, 2026

(54) BEVERAGE PREPARATION MACHINE

(71) Applicant: SOCIETE DES PRODUITS NESTLE S.A., Vevey (CH)

(72) Inventors: Alexandre Pugliese, Paudex (CH); Alexandre Perentes, Sullens (CH)

(73) Assignee: Société des Produits Nestlé S.A., Vevey (CH)

( * ) Notice: Subject to any disclaimer, the term of this patent is extended or adjusted under 35 U.S.C. 154(b) by 897 days.

(21) Appl. No.: 18/005,248

(22) PCT Filed: Jun. 24, 2021

(86) PCT No.: PCT/EP2021/067307
§ 371 (c)(1),
(2) Date: Jan. 12, 2023

(87) PCT Pub. No.: WO2022/012895
PCT Pub. Date: Jan. 20, 2022

(65) Prior Publication Data

US 2023/0337850 A1 Oct. 26, 2023

(30) Foreign Application Priority Data

Jul. 15, 2020 (EP) .................................... 20185873

(51) Int. Cl.
*A47J 31/06* (2006.01)
*A47J 31/44* (2006.01)
*A47J 31/52* (2006.01)

(52) U.S. Cl.
CPC ....... *A47J 31/0689* (2013.01); *A47J 31/4492* (2013.01); *A47J 31/52* (2013.01)

(58) Field of Classification Search
CPC .... A47J 31/0689; A47J 31/4492; A47J 31/52; A47J 31/3671; A47J 31/5253; A47J 31/3609; A47J 31/525; A47J 31/42; A47J 31/404; A47J 31/36; A47J 31/5255; A47J 31/34; A47J 31/545; A47J 31/24;
(Continued)

(56) References Cited

U.S. PATENT DOCUMENTS

2010/0239734 A1* 9/2010 Yoakim .................. A47J 31/22
99/302 C
2015/0135962 A1* 5/2015 Jarisch ................ G11C 7/1006
235/492

FOREIGN PATENT DOCUMENTS

WO 2012059892 5/2012
WO 2013160318 10/2013

* cited by examiner

*Primary Examiner* — Phuong T Nguyen
(74) *Attorney, Agent, or Firm* — Thorpe North & Western, LLP

(57) ABSTRACT

The beverage preparation machine (1) comprises: a beverage preparation device (2) with a holding section (10) for detachably holding a beverage component holder (12) that comprises: a cavity (14) for receiving a beverage component suitable for interacting with a liquid to prepare a beverage, and a transponder (16) configured to store data related to the beverage component, a liquid delivery device (4) for delivering a liquid via a liquid inlet (18) into the cavity (14), a liquid discharge device (6) for discharging the prepared beverage via a discharge outlet (22) out of the cavity (14) to a dispensing outlet (24), and a control unit (8) for controlling a liquid flow from the liquid delivery device (4) via the cavity (14) to the liquid discharge device (6) based on the stored data.

16 Claims, 8 Drawing Sheets

(58) Field of Classification Search
CPC ...... A47J 31/30; A47J 31/5251; A47J 31/468; A47J 31/56; A23F 5/26
USPC ......... 99/293, 295, 279, 280, 281, 282, 283, 99/284, 291, 300
See application file for complete search history.

BEVERAGE PREPARATION MACHINE

CROSS REFERENCE TO RELATED APPLICATIONS

The present application is a National Stage of International Application No. PCT/EP2021/067307, filed on Jun. 24, 2021, which claims priority to European Patent Application No. 20185873.5, filed on Jul. 15, 2020, the entire contents of which are being incorporated herein by reference.

1. FIELD OF THE INVENTION

The invention is directed to a beverage preparation machine for preparing a beverage with a beverage component interacting with a liquid. The invention is further directed to a method for preparing a beverage with such a beverage preparation machine.

2. TECHNICAL BACKGROUND

A known beverage preparation machine has a beverage preparation device which comprises a removeable holder for carrying a beverage component, like tea or coffee. When carried by the beverage component holder the beverage component can be functionally inserted into the beverage preparation device. The beverage preparation device may transfer a liquid, like water, that is delivered to and flows through the beverage component holder so as to interact with the beverage component and thus produce a beverage. Interaction of the liquid with the beverage component can for instance be infusion, extraction or dissolution of the beverage component by means of the liquid, or any other kind of interaction suitable for producing a beverage product or beverage.

The beverage component may be carried in a bulk state within the beverage component holder. The beverage component holder may be filled with a portion of beverage component in a bulk state by a component dispenser.

The component dispenser may be located in the vicinity of the beverage preparation machine. The component dispenser may be configured to dispense various beverage components in a bulk state, for example tea leaves or coffee ground.

The component dispenser may comprise:

- a tank containing the beverage component 15, preferably in a bulk state,
- a movable shutter arranged to selectively open and close a passage between the tank and the beverage component holder, when the beverage component holder is coupled to the component dispenser, and
- an actuator configured to actuate the movable shutter in order to selectively allow or prevent a flow of the beverage component between the tank and the cavity.

The actuator may be a rotary electrical motor and the movable shutter may be a rotatable shutter. The component dispenser may be configured such that a flow of the beverage component between the tank and the cavity occurs by gravity.

When a customer wishes to prepare a beverage, the customer can couple the beverage component holder to the component dispenser, and then select a beverage component, such that the component dispenser may dispense a portion of the beverage component in a bulk state into the beverage component holder. Then, the customer can couple the beverage component holder to the beverage preparation machine in order to get the beverage prepared by interaction of the beverage component with a liquid delivered by a liquid delivery device of the beverage preparation machine.

However, when ordering the preparation of a beverage, the customer must know and enter the proper parameters for controlling the interaction of the liquid with the beverage component carried by the beverage component holder. As there can be various beverage components and numerous parameters, the customer risks entering wrong parameters and thus obtain a beverage of poor or suboptimal quality e.g. taste.

3. SUMMARY

It is thus an object of the invention to provide a beverage preparation machine as well as a method for preparing a beverage, which facilitates the preparation by the customer of a beverage with a beverage component in a bulk state, while allowing a properly controlled interaction of liquid and beverage component so as to enhance the quality of the beverage.

According to a first aspect, the invention is directed to a beverage preparation machine comprising a beverage preparation device having a holding section configured for detachably holding a beverage component holder. The beverage component holder comprises: i) a cavity for receiving a beverage component suitable for interacting with a liquid so as to prepare a beverage, the beverage component being preferably in a bulk state, and ii) a transponder configured to store data related to the beverage component received in the cavity. The beverage preparation machine further comprises a liquid delivery device for delivering a liquid via a liquid inlet into the cavity when the beverage preparation device is holding the beverage component holder. The beverage preparation machine also comprises a liquid discharge device for discharging the delivered liquid, preferably the prepared beverage, via a discharge outlet out of the cavity to a dispensing outlet. Further, the beverage preparation machine comprises a control unit, which is configured to control a liquid flow from the liquid delivery device via the cavity to the liquid discharge device based on the data stored in the transponder.

Thus, a beverage preparation machine according to the invention allows for a facilitated preparation by the customer of a beverage with a beverage component in a bulk state. In addition, a beverage preparation machine according to the invention allows for a properly controlled interaction of liquid and beverage component. Hence, a beverage preparation machine according to the invention allows for an enhancement of the quality of the beverage.

The holding section may preferably be further configured to detachably hold a capsule holder in lieu of the beverage component holder. The capsule holder may comprise an accommodating cavity for accommodating a capsule carrying a beverage component suitable for interacting with a liquid so as to prepare a beverage. The liquid delivery device may be further configured to deliver a liquid via the liquid inlet into the accommodating cavity when the beverage preparation device is holding the capsule holder. The liquid discharge device may be further configured to discharge the delivered liquid, preferably the prepared beverage, via the discharge outlet out of the accommodating cavity to a dispensing outlet. The control unit may preferably be further configured to control a liquid flow from the liquid delivery device via the accommodating cavity to the liquid discharge device based on data carried by the capsule, if any.

Thus, the beverage component may be carried in a capsule in lieu of a beverage component holder, the capsule being carried by a capsule holder which is itself held by the beverage preparation device. The beverage preparation machine may thus prepare a beverage by having a liquid interact with the beverage component carried in the capsule.

The beverage preparation machine may preferably further comprise a wireless reader, which is preferably provided at or in the beverage preparation device, the wireless reader being configured for reading the data stored in the transponder, preferably when the beverage preparation device is holding the beverage component holder, and the wireless reader being preferably further configured for reading the data carried on the capsule, if any, preferably when the beverage preparation device is holding the capsule holder.

Thus, the control unit may receive data relating to the beverage component as read by the wireless reader. Based on these data the control unit may control the beverage preparation machine and method to achieve a proper interaction of the liquid with the beverage component.

The transponder may preferably be an RFID tag, and the beverage preparation machine may comprise, preferably as the wireless reader, an RFID reader configured for reading the data stored in the RFID tag and, preferably, data carried on a capsule in the form of an RFID tag. Preferably, the beverage preparation machine may further comprise an optical reader for reading data carried on a capsule in the form of an optically readable code, like a barcode or 2D-barcode.

Thus, the RFID tag and reader may quickly provide the control unit with the data required to prepare the beverage.

Alternatively, the transponder may include a writable memory element, an emitting element e.g. a Bluetooth® antenna, and a powering element e.g. a battery, those elements being interconnected. For example, the transponder may be a capacitive tag.

The data stored in the transponder and, if present, the data carried on the capsule may preferably contain at least one parameter belonging to the group consisting of: a temperature of the delivered liquid, a volume of the delivered liquid, an infusing time for maintaining the delivered liquid in the cavity, a number of reiterated infusing operations with the same beverage component.

Thus, the control unit may properly control the interaction of the liquid with the beverage component and thus prepare a beverage of enhanced quality.

The beverage preparation machine may further comprise a gas evacuation device for evacuating gas, like air, out of the cavity of the beverage component holder via a gas outlet, preferably during beverage preparation or liquid delivery into the cavity.

Thus, evacuating gas prevents it from disturbing the interaction between the liquid and the beverage component.

At least one of the liquid inlet, the discharge outlet and, if present, the gas outlet is arranged to protrude into the cavity or, if present, into the accommodating cavity, preferably via a respective opening extending in a side wall delimiting the cavity or, if present, the accommodating cavity.

Thus, the liquid inlet, the discharge outlet and, if present, the gas outlet may efficiently deliver liquid and evacuate liquid or gas, respectively.

At least one of the liquid inlet, the discharge outlet and, if present, the gas outlet may preferably taper towards the cavity or, if present, towards the accommodating cavity to form a piercing tip or needle when the beverage preparation device is holding the beverage component holder.

Thus, the piercing tip may pierce a filter or a wall before liquid gets delivered via the liquid inlet or gas gets evacuated via the gas outlet.

The liquid inlet and, if present, the gas outlet may preferably be positioned higher than the discharge outlet when the beverage preparation device is in its service configuration.

Thus, the beverage may not soil the liquid inlet or the gas outlet during the dispensing of a beverage.

The beverage component holder may preferably comprise a filter element to withhold the beverage component in the cavity, preferably towards the discharge outlet, when the liquid delivery device is delivering liquid, wherein the filter element preferably separates the cavity from the discharge outlet or discharge opening.

Thus, the filter element may totally or partially prevent the bulk beverage component from flowing along with the beverage down to the customer's cup. This may enhance the quality of the beverage.

The filter element may preferably be located in a lower region, preferably in a lowermost region, of the cavity, the filter element being preferably arranged near or adjacent the discharge outlet.

Thus, the pressure drop caused by the filter element may be minimized.

The beverage component holder may preferably comprise a prehension portion configured to allow a customer to manipulate the beverage component holder, the prehension portion including preferably at least one knurled region.

Thus, the customer may easily manipulate the beverage component holder, in particular when coupling it to the component dispenser and then to the beverage preparation machine.

According to a further aspect, the invention is directed to a beverage preparation method for preparing a beverage, comprising:

Providing a beverage preparation machine according to any one of the preceding claims, Filling the cavity of the beverage component holder with a beverage component, preferably in a bulk state, Storing in the transponder data related to the beverage component received in the cavity, Attaching the filled beverage component holder to the beverage preparation device, Receiving, by the control unit, the data from the transponder, Based on the data received from the transponder, controlling, by the control unit, a liquid flow so as to deliver a liquid by the liquid delivery device into the cavity via the liquid inlet, so that the beverage component in the cavity may interact with the liquid to produce a beverage, and discharging the beverage via the discharge outlet out of the cavity to the dispensing outlet of the liquid discharge device.

Thus, a beverage preparation method according to the invention allows for a facilitated preparation by the customer of a beverage with a beverage component in a bulk state. In addition, a beverage preparation method according to the invention allows for a properly controlled interaction of liquid and beverage component. Hence, a beverage preparation method according to the invention allows for an enhancement of the quality of the beverage.

4. BRIEF DESCRIPTION OF THE DRAWINGS

Further features, details and advantages of the invention will now be described in relation to the embodiments of the enclosed figures.

FIG. 1 shows i) schematically a beverage preparation machine according to an embodiment of the invention, and ii) in an exploded view, a part of a beverage preparation device as well as a beverage component holder and a capsule holder both represented a) as attached to the beverage preparation device and b) as detached from the beverage preparation device.

FIG. 2 shows i) schematically the beverage preparation machine depicted in FIG. 1, and ii) in a side perspective view with a partial cross-section, the part of a beverage preparation device depicted in FIG. 1 as well as a beverage component holder and a capsule holder depicted in FIG. 1, wherein the capsule holder is represented as attached to the beverage preparation device while the beverage component holder is represented both a) as attached to the beverage preparation device and b) as detached from the beverage preparation device.

5. DETAILED DESCRIPTION

Figure 1:
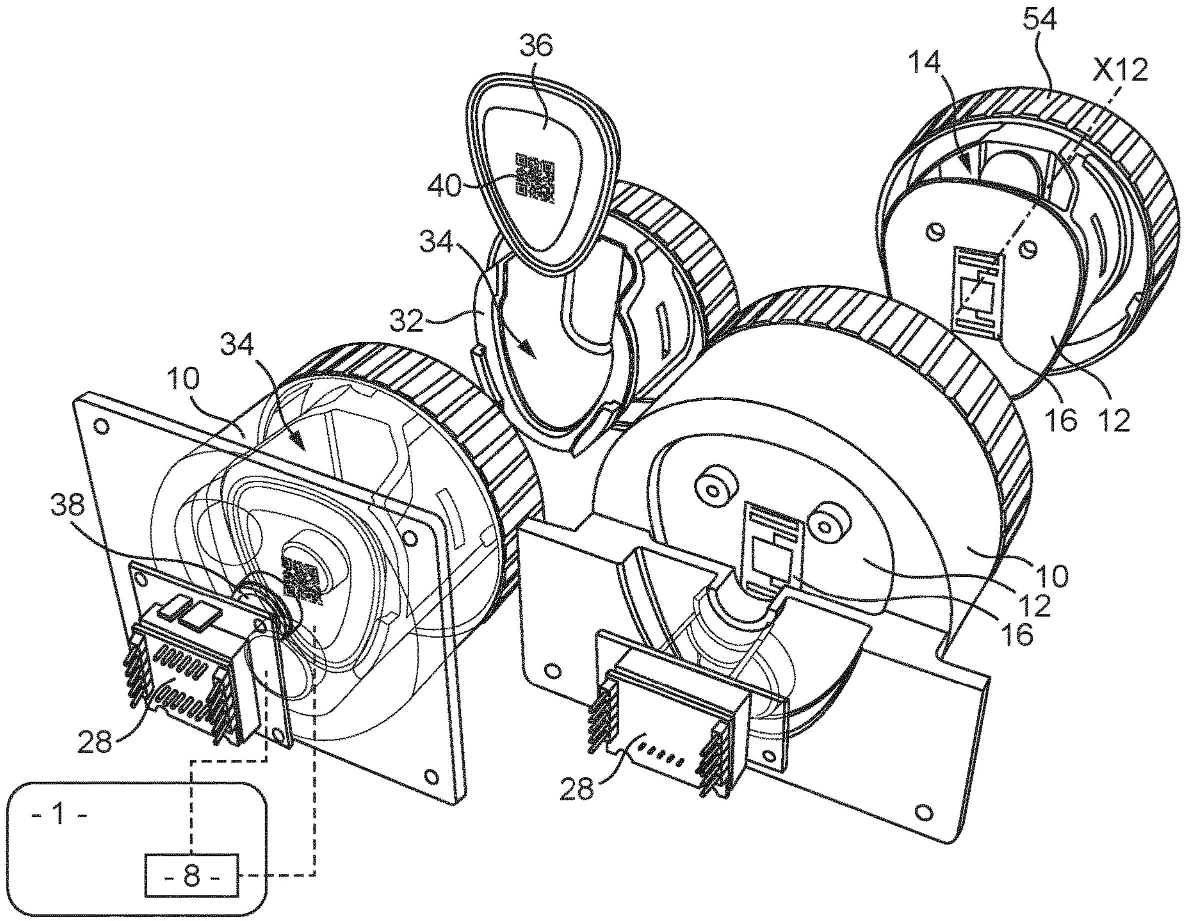
Figure 2:
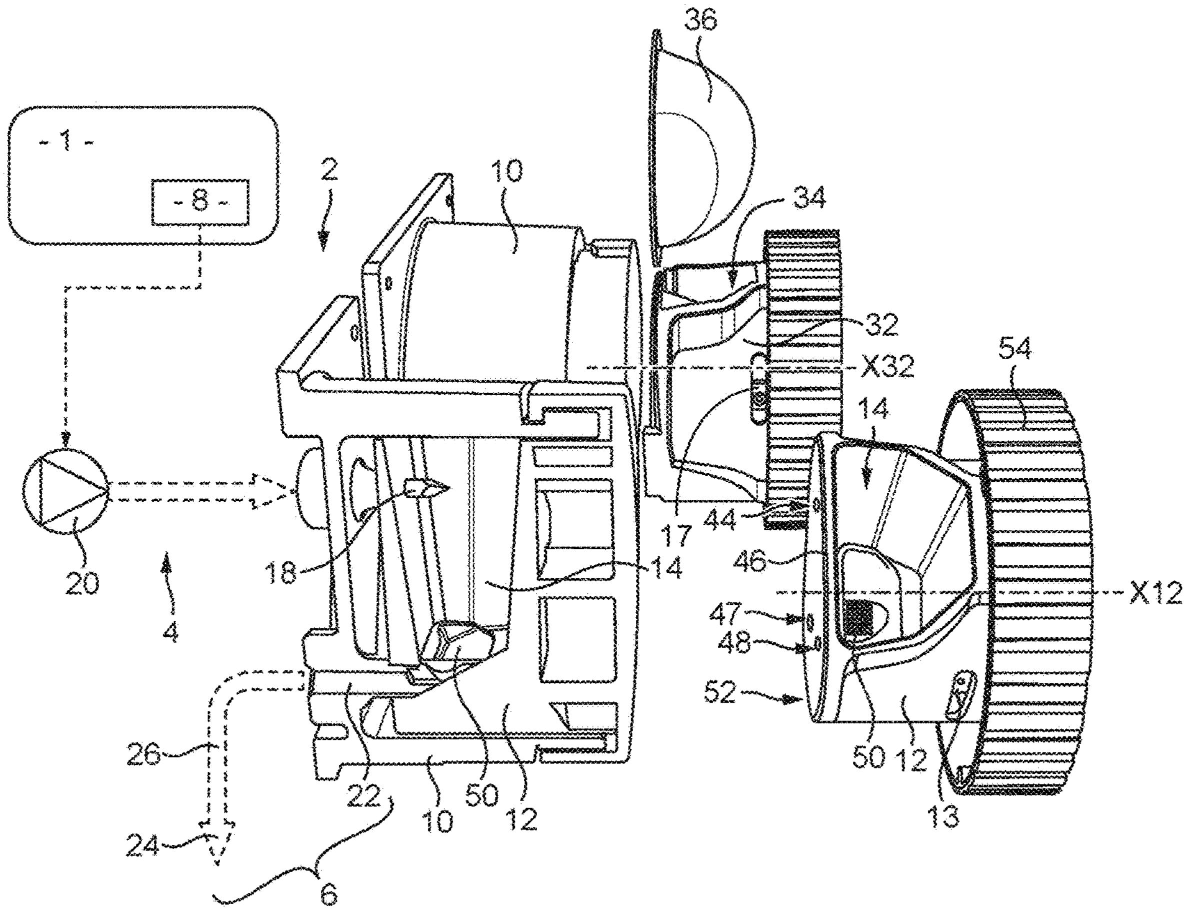
Figure 3:
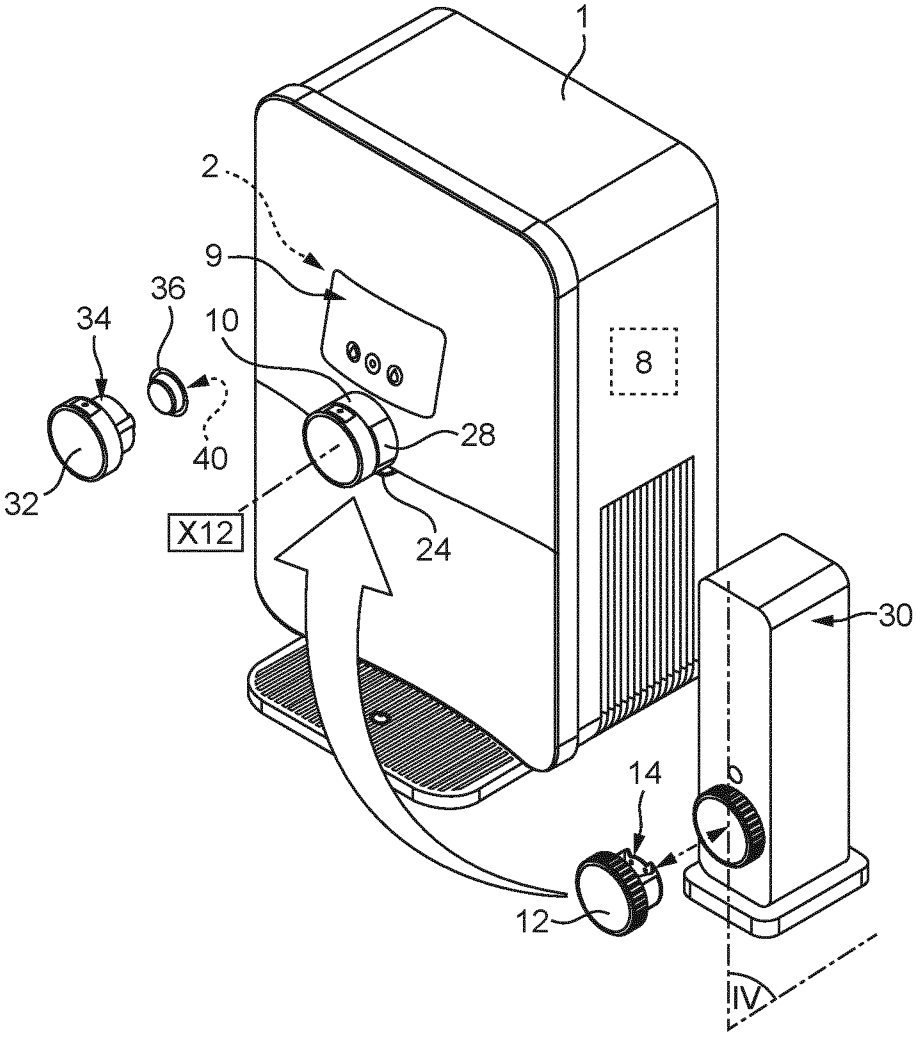
FIG. 3 shows schematically in a side perspective view a beverage preparation machine according to a further embodiment of the invention and a component dispenser.

FIGS. 1 and 2 show an embodiment of a beverage preparation machine 1 and particular details and parts thereof. The beverage preparation machine 1 is provided to prepare a beverage, e.g. a beverage, from a beverage component, like coffee, tea, soup or other beverage or comestible component depending on the customer's selection.

In order to prepare a beverage product or a comestible product, the beverage preparation machine 1 is configured to allow interaction of a liquid, like water, with the beverage component, e.g. by way of infusion, extraction, dissolution and the like. The beverage component is suitable for interacting with a liquid so as to prepare a beverage.

The beverage preparation machine 1 comprises a beverage preparation device 2, a liquid delivery device 4, a liquid discharge device 6, and a control unit 8. The beverage preparation machine 1 may further comprise a customer's interface, for example a touchscreen configured to allow the customer to place an order for the preparation of a beverage.

The beverage preparation device 2 has a holding section 10, which is configured for detachably holding a beverage component holder 12. The beverage component holder 12 may be attached to, and thus held by, the holding section 10, for example when preparing a beverage. The beverage component holder 12 may be inserted in the holding section 10 and attached thereto in an attachment direction X12.

In FIGS. 1 and 2 the beverage component holder 12 is represented both:

- as attached to the beverage preparation device 2 (left, front side of the drawing) and
- as detached and separated from the beverage preparation device (right, rear side of the drawing).

Hence, some reference signs might be duplicated for the sake of legibility.

The beverage component holder 12 may have a lock element 13, which is configured to detachably lock the beverage component holder 12 to the holding section 10, for example when a customer rotates the beverage component holder 12 around the attachment direction X12. The lock element 13 may for example be a bayonet lock structure. After a beverage has been prepared, the beverage component holder 12 may be unlocked, as the case may be, detached, and then separated from the holding section 10.

The beverage component holder 12 comprises:

- a cavity 14 for receiving a not shown beverage component, which is preferably in a bulk state, and
- a transponder 16 configured to store data related to the beverage component received in the cavity 14, as detailed in more details hereinafter.

The beverage component may be similar to the beverage component 15 depicted in FIG. 3-6. The beverage component in a bulk state may be dispensed in the cavity 14 by a component dispenser similar to the component dispenser 30, as described hereinafter in relation to FIG. 3-10.

The liquid delivery device 4 is configured for delivering a liquid via a liquid inlet 18 into the cavity 14 when the beverage preparation device 2 is holding the beverage component holder 12. The liquid delivery device 4 may further comprise, or be fluidly connected to, a pump 20 and a not shown liquid source. The liquid source, the pump 20, and the liquid delivery device 4 may be fluidly connected by liquid lines or ducts, which may be formed by tubes, hoses, pipes or the like.

The pump 20 may preferably be controlled by the control unit 8. The pump 20 may be controlled to move liquid from the liquid source to the liquid delivery device 4 in order to prepare a beverage in the cavity 14.

Further, the liquid delivery device 4 may transfer a liquid, like a sanitizing liquid, for a sanitization purpose, into the cavity 14 when the beverage component holder 12 is held in the holding section 10, in order to sanitize the fluid lines of the beverage preparation machine 1.

The liquid discharge device 4 is configured for discharging the delivered liquid, preferably the prepared beverage, via a discharge outlet 22 out of the cavity 14 to a dispensing outlet 24. The liquid discharge device 4 may include a discharge duct 26, which may guide the prepared beverage downstream the beverage component holder 12 and toward the dispensing outlet 24 and a not shown customer's cup thereunder.

The control unit 8 is configured to control a liquid flow from the liquid delivery device 4 via the cavity 14 to the liquid discharge device 6 based on the data stored in the transponder 16.

The data stored in the transponder 16 may contain at least one parameter belonging to the group consisting of: a temperature of the delivered liquid, a volume of the delivered liquid, an infusing time for maintaining the delivered liquid in the cavity, a number of reiterated infusing operations with the same beverage component. Such parameter(s) may thus be used by the control unit 8 for controlling the interaction of the liquid with the beverage component.

In order to read the data stored in the transponder 16, the beverage preparation machine 1 may further comprise a wireless reader 28. The wireless reader 28 may be configured for reading the data stored in the transponder 16, in particular when the beverage preparation device 2 is holding the beverage component holder 12.

The wireless reader 28 may be provided at or in the beverage preparation device 2. In the example of FIG. 1-2, the wireless reader 28 is located close to the holding section 10. The transponder 16 may be an RFID tag, and the wireless reader 28 may be an RFID reader configured for reading the data stored in the RFID tag.

Besides, the beverage preparation machine 1 may further comprise a capsule holder 32, which is configured for receiving a capsule 36. The capsule 36 may contain a not shown beverage component, like tea or coffee, suitable for interacting with a liquid, like water, so as to prepare a beverage. The capsule 36 may be disposable.

In FIGS. 1 and 2 the capsule holder 32 is represented both:

as attached to the beverage preparation device 2 but without capsule (left, front side of the drawing) and as detached and separated from the beverage preparation device 2 with a capsule 36 above it (right, rear side of the drawing).

Hence, some reference signs might be duplicated for the sake of legibility.

The holding section 10 may be further configured to detachably hold the capsule holder 32 in lieu of the beverage component holder 12. Depending on the beverage a customer wishes to have prepared, the customer may choose to put either the capsule holder 32 or the beverage component holder 12 in the holding section 10. The capsule holder 32 may be inserted in the holding section 10 and attached thereto in an attachment direction X32.

The capsule holder 32 may have a lock element 17, which may be configured to detachably lock the capsule holder 32 to the holding section 10, for example when a customer rotates the capsule holder 32 around the attachment direction X32. The lock element may for example be a bayonet lock structure. After a beverage has been prepared, the capsule holder 32 may be unlocked, as the case may be, detached, and then separated from the holding section 10.

The capsule holder 32 may comprise an accommodating cavity 34 for accommodating the capsule 36. As shown in FIG. 1-2, the accommodating cavity 34 can have a cross-section that is non cylindrically symmetric and/or non cyclically symmetric, thus providing a unique orientation for a capsule 36 to be received therein, in particular as the capsule 36 has a corresponding shape.

The liquid delivery device 4 may further be configured to deliver liquid via the liquid inlet 18 into the accommodating cavity 34, in particular into the capsule 36, when the beverage preparation device 2 is holding the capsule holder 32. Also, the liquid discharge device 6 may be configured to discharge the prepared beverage, or any delivered liquid, via the discharge outlet 22 out of the accommodating cavity 34 to the dispensing outlet 24.

The control unit 8 may further be configured to control a liquid flow from the liquid delivery device 4 via the accommodating cavity 34 to the liquid discharge device 6 based on data carried by the capsule 36.

The data carried on the capsule 36 may contain at least one parameter belonging to the group consisting of: a temperature of the delivered liquid, a volume of the delivered liquid, an infusing time for maintaining the delivered liquid in the cavity, a number of reiterated infusing operations with the same beverage component. Such parameter(s) may thus be used by the control unit 8 for controlling the interaction of the liquid with the beverage component contained in the capsule 36.

The beverage preparation machine 1 may preferably further comprise an optical reader 38 for reading data carried on the capsule 36 in the form of an optically readable code 40, like a barcode or 2D-barcode. The optical reader 38 may read the optically readable code 40, in particular when the beverage preparation device 2 is holding the capsule holder 32 with a capsule 36 in the accommodating cavity 34.

In an alternative and non-illustrated embodiment, the data carried on the capsule could be in the form of a further transponder, for example an RFID tag, and the wireless reader could be further configured for reading the RFID data carried on the capsule, in particular when the beverage preparation device is holding the capsule holder with a capsule in the accommodating cavity.

Further, the beverage preparation machine 1 may comprise a gas evacuation device (not visible in the Figures) for evacuating gas, like air, out of the cavity 14 of the beverage component holder 12 via a non-illustrated gas outlet, preferably during beverage preparation or liquid delivery into the cavity 14. The gas evacuation device 42 may further comprise a fluid connection to a not shown external gas outlet for releasing gas out of the beverage preparation machine 1. The gas outlet and the external gas outlet may be connected by not shown gas lines or ducts, e.g. in the form of tubes, hoses, pipes or the like.

The liquid inlet 18 and, if present, the gas outlet may be positioned higher than the discharge outlet 22 when the beverage preparation device 2 is in its service configuration.

The liquid inlet 18 may be arranged to protrude into the cavity 14 or, if present, into the accommodating cavity 34, preferably via an opening 44 extending in a side wall 46 delimiting the cavity 14 or, if present, the accommodating cavity 34. Likewise, the discharge outlet 22 may protrude into the cavity 14 or, if present, into the accommodating cavity 34, preferably via an opening 47 extending in the side wall 46. Likewise, the not shown gas outlet may protrude into the cavity 14 or, if present, into the accommodating cavity 34, preferably via an opening 48 extending in the side wall 46.

The liquid inlet 18, the discharge outlet 22 and, if present, the gas outlet may taper towards the cavity 14 or, if present, towards the accommodating cavity 34 to form a piercing tip when the beverage preparation device 2 is in its service configuration, that is holding the beverage component holder 12 or the capsule holder 32.

The beverage component holder 32 may comprise a filter element 50. The filter element 50 may be configured to withhold the beverage component in the cavity 14, preferably towards the discharge outlet 22, when the liquid delivery device 4 is delivering liquid.

The filter element 50 may separate the cavity 14 from the discharge outlet 22, hence from the liquid discharge device 6. The filter element 50 may be located in a lowermost region 52 of the cavity 14. The filter element 50 may preferably be arranged near or adjacent the discharge outlet 22. As visible in FIG. 2 the filter element 50 has a series of small holes that are generally smaller than the particles forming the beverage component.

Besides, the beverage component holder 12 may comprise a prehension portion 54. The prehension portion 54 may be configured to allow a customer to manipulate the beverage component holder 12. As illustrated in FIG. 1-2 the prehension portion 54 may include a knurled region. In the example of FIG. 1-2 the prehension portion 54 may have the shape of a ring that is knurled on its periphery. The prehension portion 54 may also include an outer cover arranged to cover the outer side of the beverage component holder 12. Likewise, the capsule holder 34 may comprise a similar prehension portion.

FIG. 3 to 10 illustrate a second embodiment of a beverage preparation machine 1. Inasmuch as the beverage preparation machine 1 of FIG. 3-10 is similar to the beverage preparation machine 1 of FIG. 1 to 2, the afore-detailed description may be applied to the beverage preparation machine 1 of FIG. 3-10. Some specificities of the embodiment of FIG. 3-10 are described hereinafter, these specificities possibly forming differences over the embodiment of FIG. 1-2. An element of the embodiment of FIG. 3-10 that has a structure or function that is substantially similar to an element of the embodiment of FIG. 1-2 is given the same reference sign or numeral as that latter element.

Like in FIG. 1-2, the beverage preparation machine 1 of FIG. 3-10 comprises:

- a beverage preparation device 2,
- a not shown liquid delivery device similar to the liquid delivery device 4 in FIG. 2,
- a not shown liquid discharge device similar to the liquid discharge device 6 in FIG. 2,
- a control unit 8, and
- a customer's interface 9, e.g. a touchscreen, to allow the customer to place an order for the preparation of a beverage.

The beverage preparation device 2 has a holding section 10 for detachably holding a beverage component holder 12, like in FIG. 1-2, in an attachment direction X12.

Figure 8:
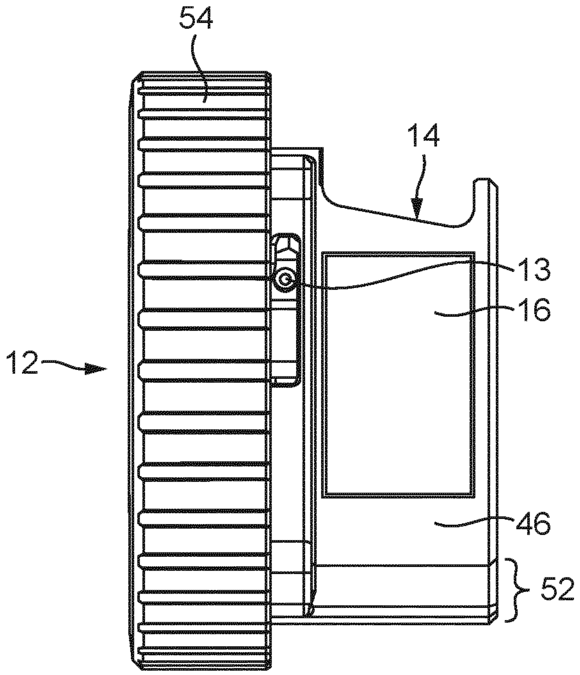
FIG. 8 is a side view along the arrow VIII in FIG. 7.
Figure 9:
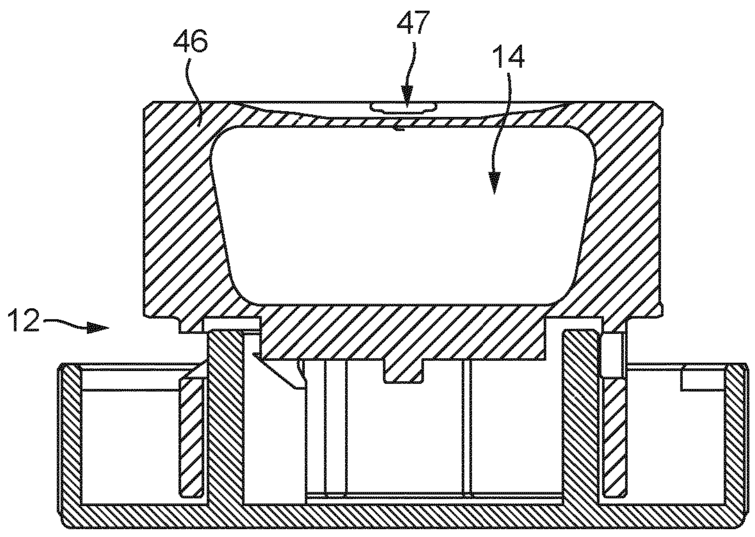
FIG. 9 is a cross-sectional view in the median plane IX in FIG. 7.
Figure 10:
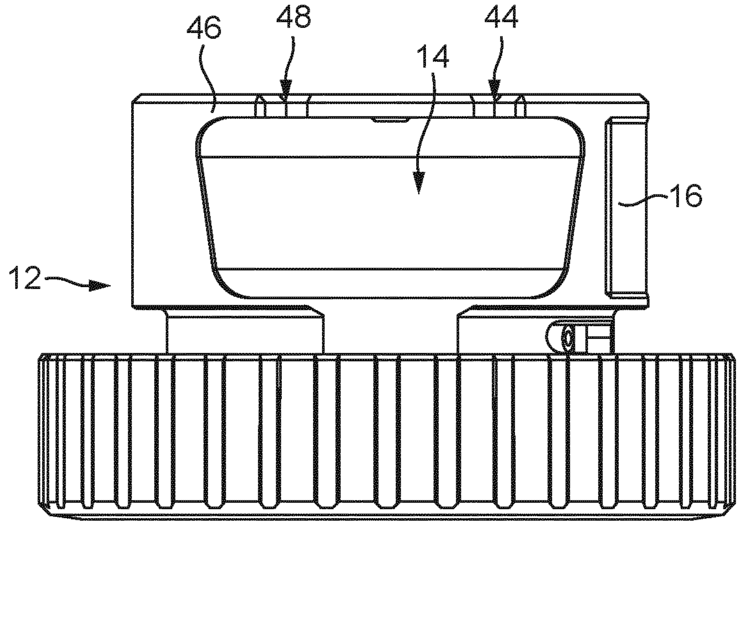
FIG. 10 is a top view along the arrow X in FIG. 7.

The beverage component holder 12 may have a lock element 13 as visible in FIG. 8, for example a bayonet lock structure. The lock element 13 may be configured to detachably lock the beverage component holder 12 to the holding section 10, for example when a customer rotates the beverage component holder 12 around the attachment direction X12.

Figure 7:
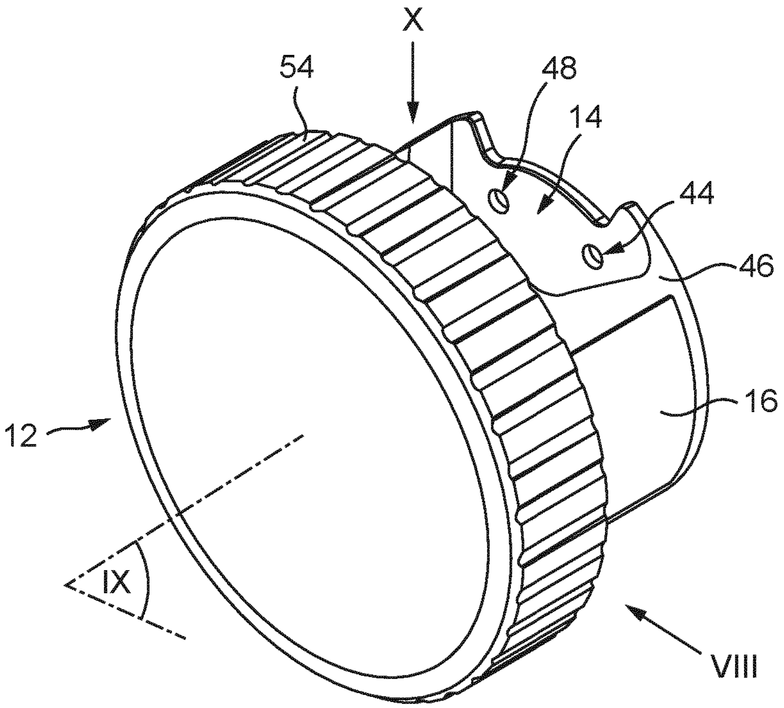
FIG. 7 is an enlarged perspective view schematically showing the beverage component holder of FIG. 3.

The beverage component holder 12 further comprises:

- a cavity 14 for receiving a beverage component 15 which is in a bulk state as visible in Fig., and
- a transponder 16, as visible in FIG. 7, 8, 10, which is configured to store data related to the beverage component 15.

Figure 4:
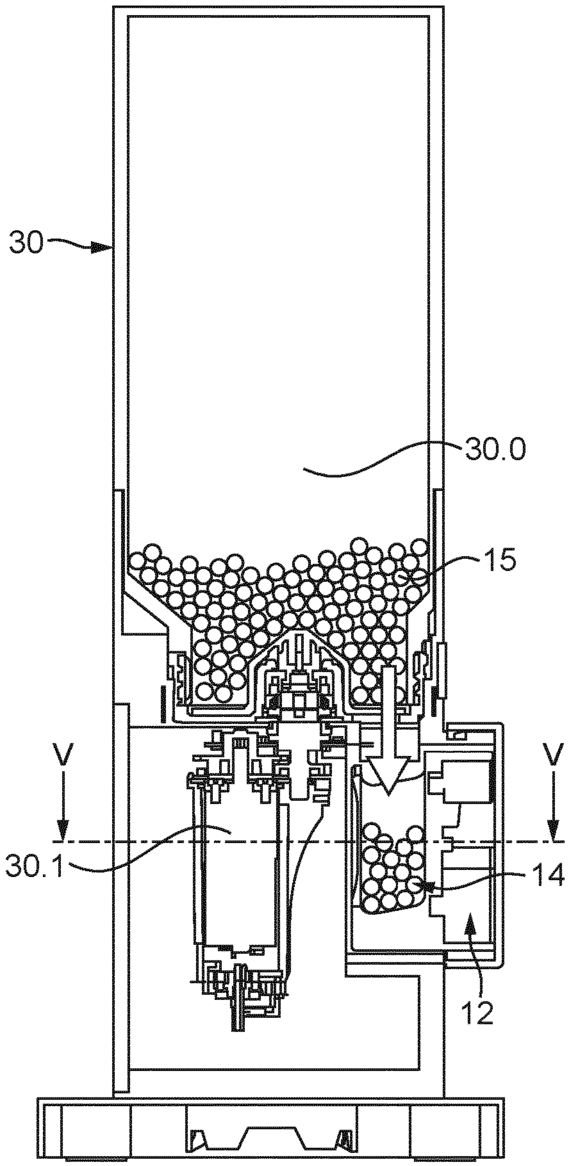
FIG. 4 is a cross-section, in the median plane IV in FIG. 3, showing the component dispenser depicted in FIG. 3.
Figure 5:
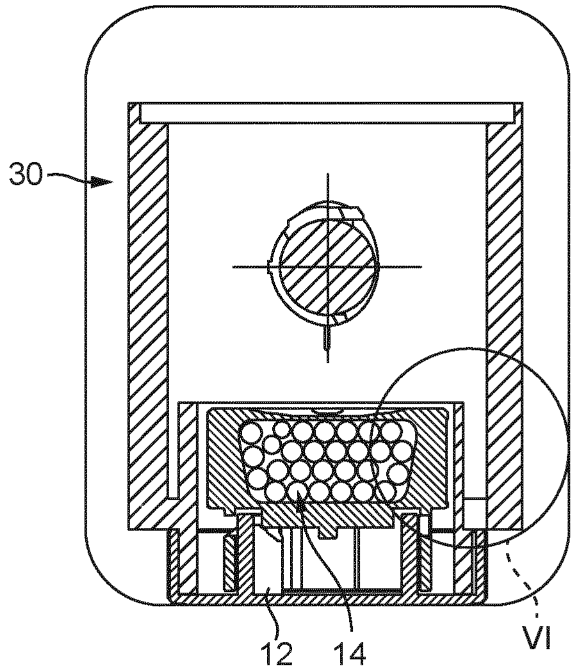
FIG. 5 is a cross-sectional view along the line V in FIG. 4.
Figure 6:
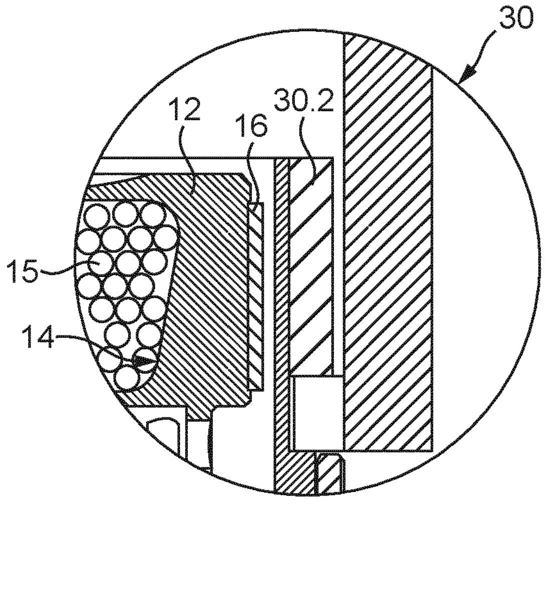
FIG. 6 is an enlarged view of the detail VI in FIG. 5.

As illustrated in FIG. 3-6, a component dispenser 30 may be arranged beside the beverage preparation machine 1. The component dispenser 30 may be configured to dispense the beverage component 15 in the cavity 14, for example in a bulk state. In the example of FIG. 4 the component dispenser 30 may comprise:

- a tank 30.0 containing the beverage component 15,
- a not shown movable shutter arranged to selectively open and close a passage between the tank 30.0 and the beverage component holder 12, and
- an actuator 30.1 configured to actuate the movable shutter in order to selectively allow or prevent a flow of the beverage component 15 between the tank and the cavity 14, when the beverage component holder 12 is coupled to the component dispenser 30.

The actuator 30.1 may be a rotary electrical motor and the movable shutter may be a rotatable shutter. The flow of the beverage component 15 between the tank and the cavity 14 may occur by gravity.

The component dispenser 30 may be further configured to encode and write the data to be stored in the transponder 16. The data may preferably be encoded and stored in the transponder 16 as a function of the customer's order and/or as a function of the nature of the beverage component 15. The component dispenser 30 may include a data encoder 30.2 configured to wirelessly store the data in the transponder 16, for example according to a RFID or Bluetooth® protocol.

The control unit 8 is configured to control a liquid flow from the liquid delivery device via the cavity 14 to the liquid discharge device based on the data stored in the transponder 16. The transponder 16 of FIG. 3-10 may contain similar data, for example parameters, as the transponder 16 of FIG. 1-2. The transponder 16 of FIG. 3-10 may be of similar structure, for example RFID tag, as the transponder 16 of FIG. 1-2.

The transponder 16 of FIG. 3-10 differs from the transponder 16 of FIG. 1-2 in that the transponder 16 of FIG. 3-10 is arranged on a lateral wall of the beverage component holder 12, whereas the transponder 16 of FIG. 1-2 is arranged on the front sidewall 46. The transponder 16 of FIG. 3-10 may substantially have the shape of a portion of cylinder, whereas the transponder 16 of FIG. 1-2 may have a flat rectangular shape.

The beverage preparation machine 1 may further comprise a wireless reader 28 to read the data stored in the transponder 16, in particular when the beverage preparation device 2 is holding the beverage component holder 12. The shape and/or position of the wireless reader 28 may be designed in correspondence respectively with the shape and/or position of the transponder 16. In the example of FIG. 3-10, the wireless reader 28 is located close to the holding section 10.

Besides, the beverage preparation machine 1 may further comprise a capsule holder 32, which is configured for receiving a capsule 36, for example a disposable capsule. The capsule holder 32 may comprise an accommodating cavity 34 for accommodating the capsule 36.

The holding section 10 may be further configured to detachably hold the capsule holder 32 in lieu of the beverage component holder 12, so as to inject liquid into and then discharge liquid from the capsule 36, like in FIG. 1-2.

The control unit 8 may further be configured to control a liquid flow from the liquid delivery device via the accommodating cavity 34 to the liquid discharge device based on data carried on an optically readable code 40 arranged on the capsule 36, like in FIG. 1-2.

Like in FIG. 1-2, the not shown liquid inlet may protrude into the cavity 14 via an opening 44 extending in the side wall 46 delimiting the cavity 14. Likewise, the not shown discharge outlet may protrude into the cavity 14 via an opening 47 extending in the side wall 46. Likewise, the not shown gas outlet may protrude into the cavity 14 via an opening 48 extending in the side wall 46. The liquid inlet and the gas outlet may preferably be arranged higher than the discharge outlet.

In a beverage preparation, the liquid delivery device may deliver liquid into the cavity 14 or into the capsule 36, where the liquid may interact with the beverage component 15. Then, the liquid discharge device may discharge the prepared beverage out of the cavity 14 or the capsule 36 to the dispensing outlet 24 and thence to a customer's cup.

Like in FIG. 1-2, the beverage component holder 32 may comprise a not shown filter element configured to withhold the beverage component 15 in the cavity 14, when the liquid delivery device 4 is delivering liquid. Besides, the beverage component holder 12 may comprise a prehension portion 54, like in FIG. 1-2.

Figure 11:
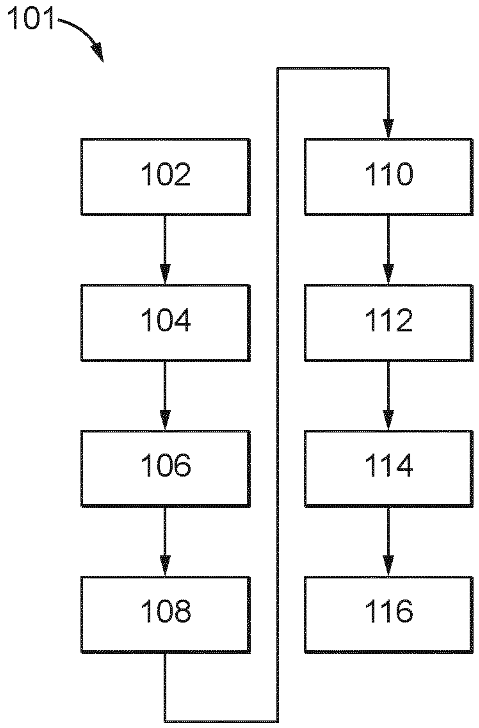
FIG. 11 is a diagram schematically illustrating a method according to an embodiment of the invention.

When the beverage preparation machine 1 is in service, a customer may have a beverage prepared according to a method 101 for preparing a beverage as shown in FIG. 11 and described hereinafter.

In a first step 102, the method 101 comprises providing the beverage preparation machine 1, in particular in its service configuration. In the service configuration, the holding section 10 approximately faces the customer to allow for the attachment of the beverage component holder 12 to the beverage preparation device 2.

In a second step 104, the method 101 comprises filling the cavity 14 of the beverage component holder 12 with e.g. the beverage component 15 of FIG. 3-6, like tea or coffee, preferably in a bulk state.

In particular, the filling 104 may be performed by the component dispenser 30 of FIG. 3-10, which may be configured to dispense a beverage component, like tea or coffee, in a bulk state in accordance with a customer's order and possibly with a customer's memorized preference. The component dispenser 30 may include various beverage components in order to offer a large choice to the customer.

When a customer wishes to prepare a beverage, the customer can couple the beverage component holder 12 to the component dispenser 30. The customer may select a beverage component 15 on the customer's interface. Then, the component dispenser 30 may dispense a portion of the beverage component in a bulk state into the cavity 14 of the beverage component holder 12 in accordance with the second step 104.

In a third step 106, the method 101 comprises storing in the transponder 16 data related to the beverage component 15 received in the cavity 14. The component dispenser 30 may be further configured to encode and write the data to be stored in the transponder 16. The data may preferably be encoded and stored in the transponder 16 as a function of the customer's order and/or as a function of the nature of the beverage component 15. The component dispenser 30 may include the data encoder 30.2 configured to wirelessly store the data in the transponder 16, for example according to a RFID or Bluetooth® protocol.

In a fourth step 108, the method 101 comprises attaching the beverage component holder 12 to the beverage preparation device 2. For example, the customer can couple the beverage component holder 12 to the beverage preparation machine 1 in order to proceed and get the beverage prepared by interaction of the beverage component 15 with a liquid delivered by the liquid delivery device 4 in the cavity 14.

In a fifth step 11*o*, the method 101 comprises receiving, by the control unit 8, the data from the transponder 16. For example, the wireless reader 28 may read the data stored in the transponder 16.

In a sixth step 112, the method 101 comprises, based on the data received from the transponder 16, controlling, by the control unit 8, a liquid flow so as to deliver a liquid by the liquid delivery device 4 into the cavity 14 via the liquid inlet 18, so that the beverage component 15 in the cavity 14 may interact with the liquid to produce a beverage.

The control unit 8 may for example control the flowrate, volume, temperature and pressure of the liquid that is to be delivered by the liquid inlet 18 in the cavity 14.

In a seventh step 114, the method 101 comprises discharging the beverage via the discharge outlet 22 out of the cavity 14 to the dispensing outlet 24.

The control unit 8 may control the duration of the interaction between the liquid and the beverage component 15 in the cavity 14, in particular by controlling the closing and opening of the discharge outlet 22.

Further, the method 101 may comprise: 116) based on the data received from the transponder 16, controlling, by the control unit 8, the liquid discharge device 6 so that the beverage component 15 in the cavity 14 may interact with the liquid during a predetermined time, for example around 30 seconds.

Besides, a method for preparing a beverage using the capsule holder 34 and a capsule 36 may be performed similarly to the method 101 and in accordance with the operations described hereinbefore in relation to the corresponding parts of the beverage preparation machine 1.

The invention is not limited to the afore-described embodiments as long as it is covered by the appended claim 1.

For example, in a non-illustrated alternative embodiment, the beverage preparation machine may comprise two holding sections: a first holding section for detachably holding a beverage component holder, as described hereinbefore, and a second holding section for detachably holding the capsule holder. The holding sections may be arranged close to one another on the beverage preparation machine. The fluidic elements of the beverage preparation machine may accordingly be duplicated to allow for a beverage preparation successively in either one of the housing sections or simultaneously in both housing sections.

The invention claimed is:

1. A beverage preparation machine comprising:

a beverage preparation device having a holding section configured for detachably holding a beverage component holder and detachably locking to the beverage component holder, the beverage component holder comprising:

a cavity for receiving a beverage component suitable for interacting with a liquid so as to prepare a beverage, a lock element configured to detachably lock the beverage component holder to the holding section when the beverage component holder is rotated around an attachment direction, wherein the attachment direction is a direction in which the beverage component holder is inserted into the holding section, and a transponder configured to store data related to the beverage component received in the cavity, a liquid delivery device for delivering a liquid via a liquid inlet into the cavity when the beverage preparation device is holding the beverage component holder, a liquid discharge device for discharging the delivered liquid via a discharge outlet out of the cavity to a dispensing outlet, and a control unit configured to control a liquid flow from the liquid delivery device via the cavity to the liquid discharge device based on the data stored in the transponder.

2. The beverage preparation machine according to claim 1, wherein the holding section is further configured to detachably hold a capsule holder in lieu of the beverage component holder, the capsule holder comprising an accommodating cavity for accommodating a capsule carrying a beverage component suitable for interacting with a liquid so as to prepare a beverage, the capsule holder further comprising a lock element configured to detachably lock the capsule holder to the holding section when the capsule holder is rotated around the attachment direction, the liquid delivery device being configured to deliver a liquid via the liquid inlet into the accommodating cavity when the beverage preparation device is holding the capsule holder, the liquid discharge device being configured to discharge the delivered liquid via the discharge outlet out of the accommodating cavity to the dispensing outlet, and the control unit being further configured to control a liquid flow from the liquid delivery device via the accommodating cavity to the liquid discharge device based on data carried by the capsule.

3. The beverage preparation machine according to claim 1, further comprising a wireless reader, the wireless reader being configured for reading the data stored in the transponder, when the beverage preparation device is holding the beverage component holder, and the wireless reader being further configured for reading the data carried on the capsule.

4. The beverage preparation machine according to claim 1, wherein the transponder is an RFID tag, and wherein the beverage preparation machine comprises an RFID reader configured for reading the data stored in the RFID tag.

5. The beverage preparation machine according to claim 1, wherein the data stored in the transponder and, if present, the data carried on the capsule contains at least one parameter belonging to the group consisting of: a temperature of the delivered liquid, a volume of the delivered liquid, an infusing time for maintaining the delivered liquid in the cavity, a number of reiterated infusing operations with the same beverage component.

6. The beverage preparation machine according to claim 1, further comprising a gas evacuation device for evacuating gas, like air, out of the cavity of the beverage component holder via a gas outlet.

7. The beverage preparation machine according to claim 1, wherein at least one of the liquid inlet, the discharge outlet and, if present, a gas outlet is arranged to protrude into the cavity or, if present, into the accommodating cavity.

8. The beverage preparation machine according to claim 1, wherein at least one of the liquid inlet, the discharge outlet and, if present, the gas outlet tapers towards the cavity or, if present, towards the accommodating cavity to form a piercing tip when the beverage preparation device is holding the beverage component holder.

9. The beverage preparation machine according to claim 1, wherein the liquid inlet and, if present, the gas outlet are positioned higher than the discharge outlet when the beverage preparation device is in its service configuration.

10. The beverage preparation machine according to claim 1, wherein the beverage component holder comprises a filter element to withhold the beverage component in the cavity, towards the discharge outlet, when the liquid delivery device is delivering liquid.

11. The beverage preparation machine according to claim 10, wherein the filter element is located in a lower region of the cavity.

12. The beverage preparation machine according to claim 1, wherein the beverage component holder comprises a prehension portion configured to allow a customer to manipulate the beverage component holder.

13. A method for preparing a beverage, comprising:

providing the beverage preparation machine of claim 1, filling the cavity of the beverage component holder with the beverage component, storing the data related to the beverage component received in the cavity, attaching the beverage component holder to the beverage preparation device, receiving, by the control unit, the data from the transponder, based on the data received from the transponder, controlling, by the control unit, the liquid flow so as to deliver the liquid by the liquid delivery device into the cavity via the liquid inlet, so that the beverage component in the cavity may interact with the liquid to produce a beverage, and discharging the beverage via the discharge outlet out of the cavity to the dispensing outlet of the liquid discharge device.

14. The method according to claim 13, wherein the filling is performed by a component dispenser configured to dispense a beverage component in a bulk state in accordance with a customer's order, and wherein the component dispenser is further configured to encode the data to be stored in the transponder.

15. The method according to claim 13, further comprising:

based on the data received from the transponder, controlling, by the control unit, the liquid discharge device so that the beverage component in the cavity may interact with the liquid during a predetermined time.

16. The beverage preparation machine according to claim 1, wherein the beverage component holder comprises an opening into the cavity configured to receive the beverage component in a bulk state from a component dispenser.

* * * * *